United States Patent [19]

Isaacs

[11] 4,298,099
[45] Nov. 3, 1981

[54] MERCHANDISE ORDER PICKING SYSTEM AND WORK TABLE

[76] Inventor: Harold Isaacs, 2567 Lafayette Dr., University Heights, Ohio 44118

[21] Appl. No.: 905,429

[22] Filed: May 12, 1978

[51] Int. Cl.³ .............................................. B61D 15/00
[52] U.S. Cl. ...................................... 186/58; 186/27; 238/281; 280/29; 280/79.3; 414/276
[58] Field of Search ............. 186/27, 1 D, 1 R, 1 AB, 186/1 P, 1 Q, 1 S, 1 T, 1 E, 1 AT, 1 AK, 1 AS, 1 AL, 58, 62–65, 35, 45–48; 214/16 B, 16.4 B, 16.4 A; 238/281, 134, 135; 104/245; 414/276, 277, 279, 281, 284, 267, 266; 280/29, 79.1 R, 79.1 A, 79.3; 180/131

[56] References Cited

U.S. PATENT DOCUMENTS

| | | | |
|---|---|---|---|
| 993,491 | 5/1911 | Wiselogel | 280/79.3 X |
| 1,122,397 | 12/1914 | Jackson | 238/135 |
| 1,126,519 | 1/1915 | Liebmann | 238/281 |
| 1,352,881 | 9/1920 | De Vaughn | 238/135 |
| 2,552,434 | 5/1951 | Klapman | 186/1 D |
| 2,835,370 | 5/1958 | Warrington | 214/16 B |
| 2,897,910 | 8/1959 | Steely et al. | 280/79.1 R X |
| 3,526,327 | 9/1970 | Atwater | 214/16.4 B |
| 3,881,574 | 5/1975 | Grange | 186/1 D X |
| 3,953,044 | 4/1976 | Wilson | 280/79.3 X |

FOREIGN PATENT DOCUMENTS 17129 of 1913 United Kingdom ................ 104/245

*Primary Examiner*—Trygve M. Blix
*Assistant Examiner*—Edmond G. Rishell, Jr.
*Attorney, Agent, or Firm*—Edward E. Sachs

[57] ABSTRACT

A merchandise order picking system includes a vertically and horizontally elongated rack having a plurality of vertically-spaced shelves and being supported on a floor surface. The rack has a rear face whereat merchandise is positioned on the shelves and an opposite front face whereat merchandise is removed from the shelves. An elongated horizontal rail extends along the front face of the rack adjacent the floor surface. A horizontal wheeled work table has inboard wheels supported and guided on the rail, and outboard wheels supported on the floor surface for rolling movement of the work table along the front face of the rack.

7 Claims, 7 Drawing Figures

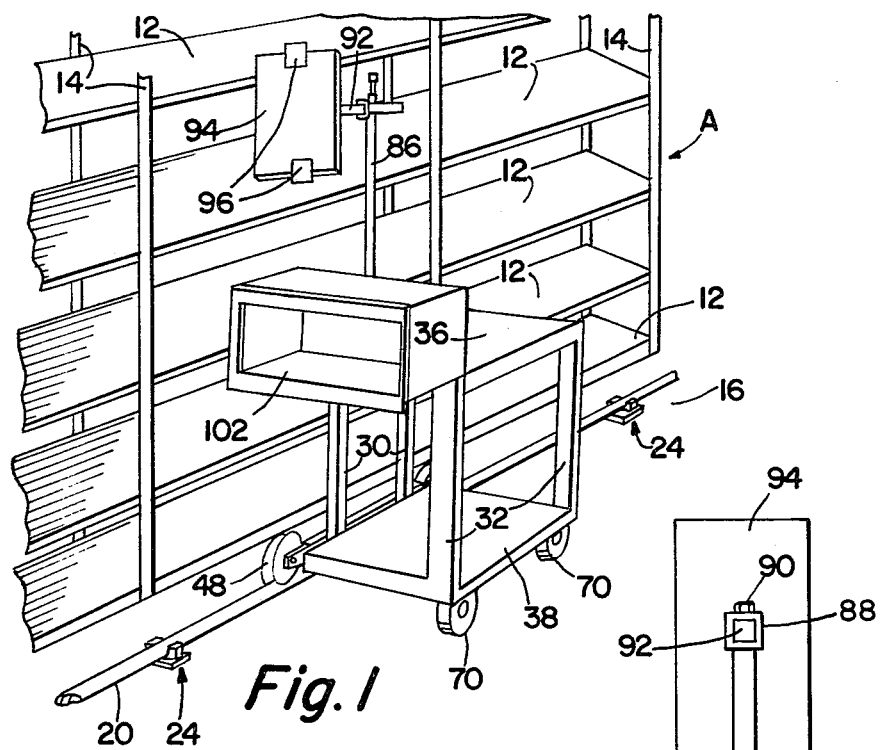
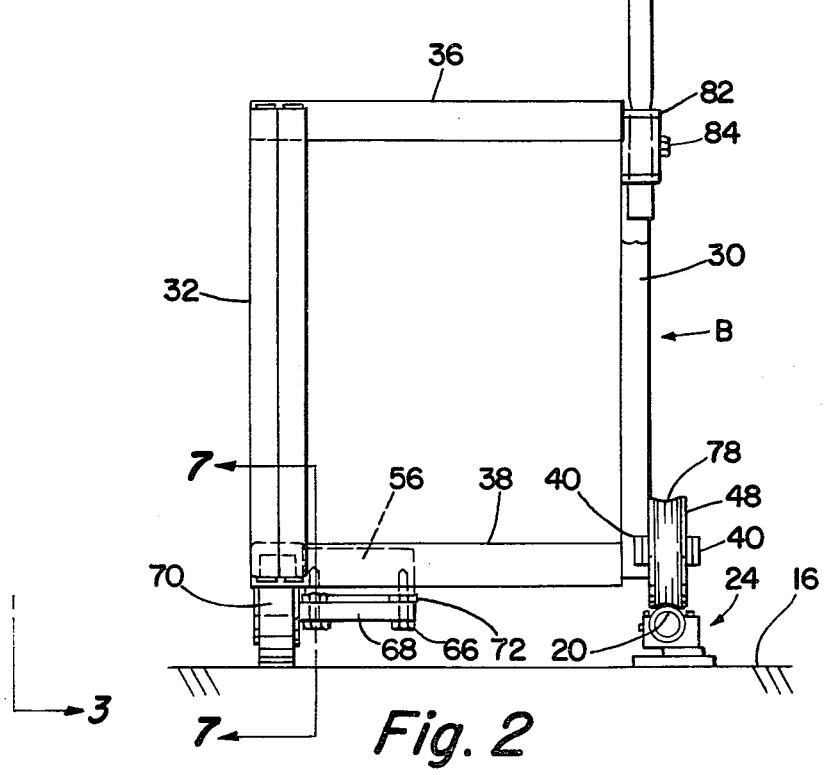

MERCHANDISE ORDER PICKING SYSTEM AND WORK TABLE

BACKGROUND OF THE INVENTION

The invention relates generally to merchandise order picking systems and, more particularly, to merchandise order picking systems of the type including a rack having a plurality of shelves and a work table movable along the rack. A person walks along the face of the rack for selectively removing merchandise therefrom and placing same on the movable work table.

Merchandise order picking systems of the type described have been in use for many years. One of the earliest systems may be described as being similar to the manner of shopping in a modern supermarket where a freely wheeled cart is moved along the floor past shelves containing different merchandise. However, a freely wheeled cart or work table will not travel along closely adjacent the shelves, and is rather difficult to manipulate to insure that it will not block aisle passages. Therefore, another known system includes upper and lower rails adjacent the top and bottom of the merchandise rack. One or more elongated upright supports are supported on the rails by wheels or rollers. One or more panels are cantilevered on the upright supports to form a movable work table. A system of this type is quite expensive to install because it requires both upper and lower horizontal rails. In addition, the upright supports and the work table must be of very heavy construction to withstand the stresses encountered due to the cantilevered construction. A substantial number of supporting and guiding rollers is required for the upper and lower ends of the upright supports in order to provide free movement of the work table along the rails, while also taking the large loads.

SUMMARY OF THE INVENTION

It is therefore the primary object of the present invention to provide an improved merchandise order picking system having a simplified movable work table.

It is a further object of the present invention to provide a movable work table having a highly simplified wheel supporting arrangement for rolling movement along the front face of a merchandise storage rack.

It is another object of the present invention to provide an improved rail construction for supporting inboard wheels mounted on a work table.

It is an additional object of the present invention to provide an improved wheeled work table for use in a merchandise order picking system.

An aspect of the present invention resides in a merchandise order picking system including a vertically and horizontally elongated rack having a plurality of vertically-spaced shelves and being supported on a floor surface. The rack has a rear face whereat merchandise is positioned on the shelves, and a front face whereat merchandise is removed from the shelves. The shelves preferably slope downwardly from the rear face of the rack toward the front face thereof to provide gravity flow of merchandise toward the front face of the rack. The shelves need not be solid, and may simply comprise braces or roller supports on which boxes of merchandise are positioned for movement by gravity flow. An elongated horizontal rail extends along the front face of the rack adjacent the floor surface. A wheeled work table has inboard wheels supporting and guided on the rail, and has outboard wheels supported on the floor surface for rolling movement of the work table along the front face of the rack.

In a preferred arrangement, the rail and the inboard wheels are cooperatively shaped for inhibiting displacement of the inboard wheels from the rail while allowing free rolling movement of the wheels on the rail. Where the rail is cylindrical, the inboard wheels have arcuate circumferential grooves which are curved at a generally circular radius slightly larger than the radius of the rail. Therefore, the inboard wheels roll along the rail in substantially line contact therewith and there is little or no dragging of the side portions of the wheel grooves on the rail.

The inboard wheels have inboard wheel axes of rotation located a substantially greater distance above the floor surface than the outboard axes of rotation of the outboard wheels. The outboard wheels are preferably vertically adjustable for leveling the work table.

In the preferred arrangement, the outboard wheels of the work table are located within the periphery of the work table so they are not in the way of a person walking in the vicinity of the work table. The inboard wheels are rotatably supported on the frame member and are located outside the periphery of the work table. The inboard and outboard wheels are preferably of substantially the same external diameter.

The work table has a supporting frame including a plurality of upright frame members having an upper substantially horizontal rectangular panel supported thereby to define the work table. The upright frame members include inboard upright frame members and outboard upright frame members. A lower horizontal frame member is secured to the exterior of the inboard frame members and the inboard wheels are rotatably mounted on the opposite ends of the horizontal frame member. A lower horizontal rectangular panel is preferably secured to the upright frame members adjacent the lower end portions thereof.

For a better understanding of the present invention, together with other and further objects thereof, reference is had to the following description taken in connection with the accompanying drawings, and its scope will be pointed out in the appended claims.

BRIEF DESCRIPTION OF THE DRAWING

FIG. 1 is a perspective illustration of a merchandise order picking system;

FIG. 2 is an end elevational view of a work table used in the system of FIG. 1;

DESCRIPTION OF A PREFERRED EMBODIMENT

Figure 3:
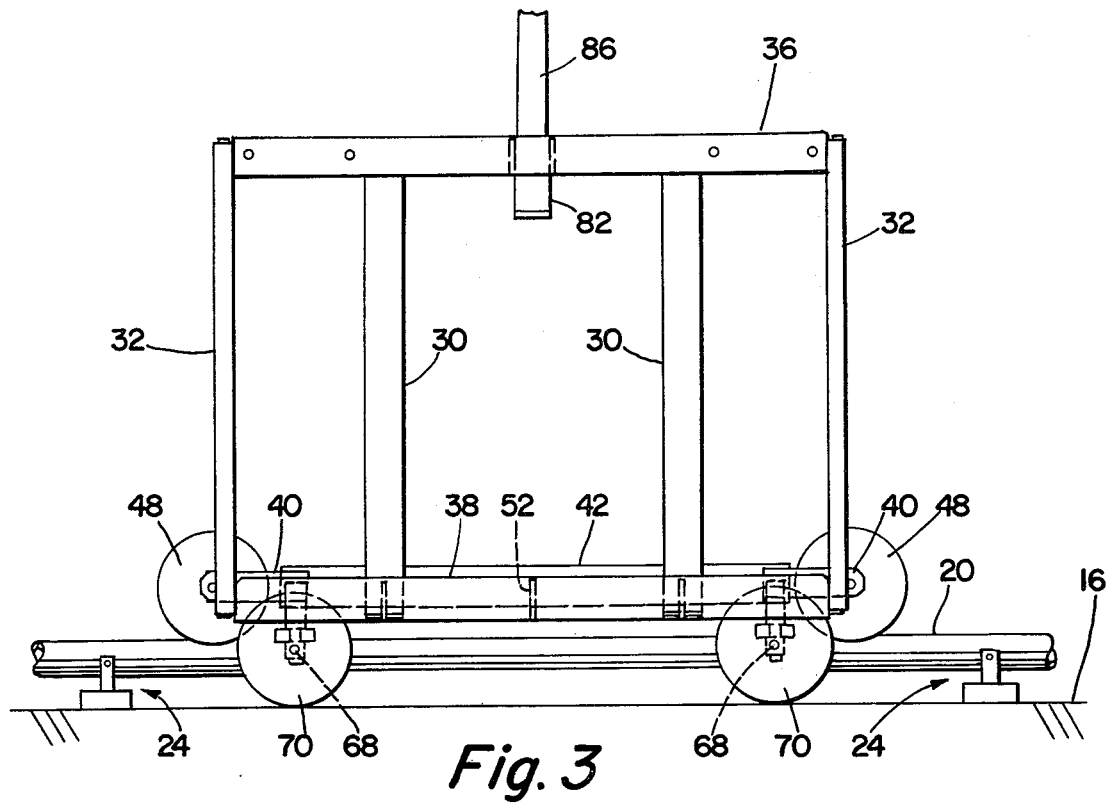
FIG. 3 is a side elevational view taken generally on line 3—3 of FIG. 2.

Referring now to the drawing, and particularly FIG. 1, there is shown a vertically and horizontally elongated rack A having a plurality of vertically-spaced shelves 12 supported on upright frame members 14 which rest upon a floor surface 16. Shelves 12 preferably slope downwardly at a relatively slight angle from the rear face of rack A toward the front face thereof. Although shelves 12 are shown solid, it will be recognized that the shelves can simply comprise spaced support members or roller assemblies on which boxes of merchandise are supported for movement under the force of gravity from the rack rear face to the rack front face. Thus, merchandise is loaded onto the shelves 12 at the rear face of rack A and removed therefrom at the front face of rack A.

An elongated horizontal rail 20 is secured to suitable supporting and leveling assemblies 24. The rail 20 is positioned adjacent the lower front face of the rack A on the supporting surface 16. A wheeled cart or work table B is supported adjacent the front face of the rack A for rolling movement therealong by a person who selects merchandise from the rack A and places same on the work table B, or in boxes supported by the work table B.

The work table B is generally rectangular in plan view and includes a frame formed by a pair of spaced-apart inboard upright frame members 30, and a pair of spaced-apart outboard upright frame members 32. In the arrangement shown, each upright outboard frame member 32 is formed by a pair of metal members having a substantially square cross-sectional configuration. The frame for the work table B further includes an upper substantially rectangular horizontal panel 36 welded to the upper end portions of the upright frame members 30 and 32. A lower substantially rectangular horizontal panel 38 is welded to the upright frame members 30 and 32 adjacent the lower end portions thereof. The rectangular panels 36 and 38 have opposite parallel side edges extending parallel to the rail 20, and opposite parallel end edges extending perpendicular to the side edges. The outboard upright frame members 32 are welded to the end edges of the panels 36 and 38 adjacent the corners thereof which intersect the outboard side edges of the panels. The inboard upright frame members 30 are welded to the inboard side edges of the panels 36 and 38 inwardly from the inboard corners of the panels. The panels 36 and 38 have downwardly extending peripheral flanges for stiffening and reinforcing same.

Figure 4:
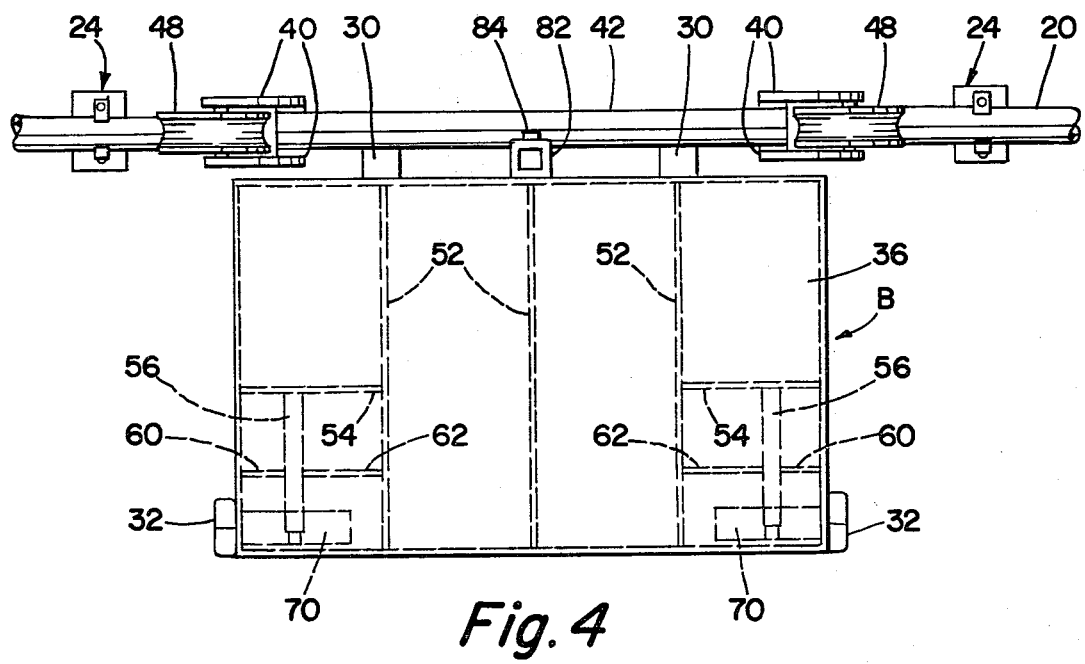
FIG. 4 is a top plan view of the work table of FIGS. 2 and 3.

As best shown in FIGS. 3 and 4, an elongated horizontal frame member 42 is welded to the inner surfaces of the inboard upright frame members 30 on the opposite side of the frame members 30 from the panels 36 and 38. The horizontal frame member 42 is generally opposite panel 38, and may be slightly spaced upwardly out of alignment therewith. A pair of arms 40 are welded to the opposite end portions of the horizontal frame member 42 for supporting horizontal axles on which inboard wheels 48 are rotatably supported. The inboard wheels 48 are located outside the periphery of the panels 36 and 38, and are located closely adjacent the inboard corners of the work table.

Figure 7:
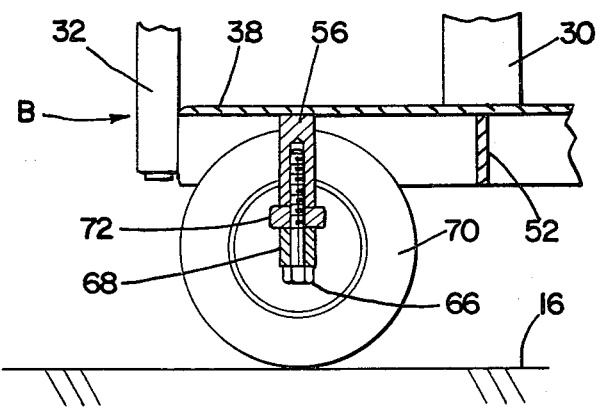
FIG. 7 is a partial cross-sectional elevational view taken generally on line 7—7 of FIG. 2.

A plurality of spaced-apart transverse reinforcing flanges 52 are welded to the underside of the lower panel 38. Wheel support braces 54 are also welded to the underside of the lower rectangular panel 38, and extend parallel to the opposite side edges thereof between a reinforcing member 52 and a flange on an end edge of the panel 38. Rectangular metal blocks 56 are suitably welded to the underside of the panel 38 and to the reinforcing members 54. Additional brace members 60 and 62 extending parallel to the brace members 54 are welded in position on the underside of the panel 38 for bracing the wheel supports 56. The wheel supports 56 have spaced vertically tapped holes for receiving bolts 66 as best shown in FIG. 7. The bolts 66 extend freely through suitable holes in rectangular portions of the axle members 68 which are circular at their outer ends for rotatably supporting outboard wheels 70. Washers or other suitable shims 72 are positionable between the wheel support members 56 and the axle members 68 for adjusting the elevation of the outboard wheels 70 to level the work table B. This provides selective vertical adjustment of the outboard wheels 70.

Figure 6:
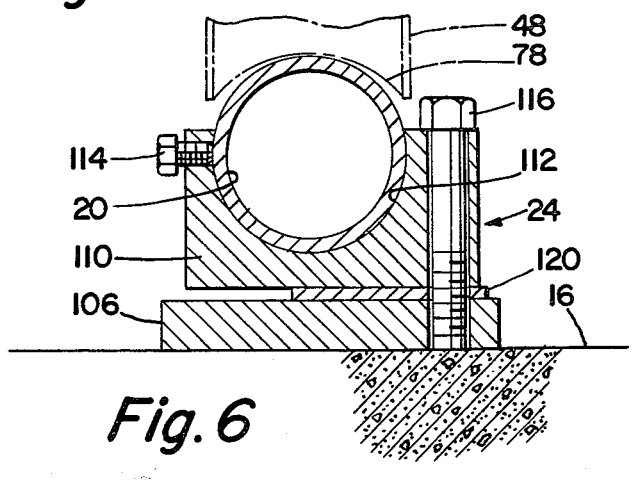
FIG. 6 is a cross-sectional elevational view taken generally on line 6—6 of FIG. 5.

The inboard wheels 48 have circumferential grooves 78 therein of arcuate cross-sectional shape as best shown in FIG. 6. The groove 78 is curved to lie substantially on the periphery of a circle having a radius slightly larger than the external radius of the cylindrical pipe rail 20. Therefore, the inboard wheels 48 roll along the rail 20 in substantially line contact therewith and the opposite side portions of the circumferential grooves 78 are spaced outwardly from the exterior surface of the rail 20 during rolling movement of the work table B. However, the opposite side portions of the groove 78 extend sufficiently toward the center of the rail 20 outwardly of the side portions thereof to prevent displacement of the inboard wheels from the rail 20. The generally circular shape of the grooves 78 for cooperation with the cylindrical rail 20 has been found to be superior to any other guiding arrangement which allows free rolling movement of the work table B, while also preventing displacement of the inboard wheels from the rail.

The inboard axes of rotation for the inboard wheels 48 are located substantially higher than the outboard axes of rotation for the outboard wheels 70. This aids in stabilizing the work table B during its rolling movement. The outboard wheels 70 are located within the periphery of the panels 36 and 38 so they do not interfer with a person walking closely adjacent the work table B. The outboard wheels 70 are preferably in line with the outboard upright supports 32 and may extend slightly therebeneath, in which case the outboard wheels 70 are still within the periphery of the work table B. The axes of rotation of the inboard wheels 48 are also located farther apart from one another than the axes of rotation for the outboard wheels 70. This further aids in stabilizing the work table B, and the mounting arrangement for the inboard wheels 48 makes assembly more convenient.

The outboard wheels 70 may be described as being positioned adjacent the outer corners of the table B within the periphery thereof, while the inboard wheels 48 are positioned adjacent the inner corners of the table B outside the periphery thereof. The inboard and outboard wheels 48 and 70 preferably have substantially the same exterior diameter.

As best shown in FIG. 4, a rectangular socket member 82 is welded to the inboard side edge of the upper panel 36 and has a locking bolt 84 threaded through a tapped hole therein. An upright standard 86 is freely received through the socket 82 as shown in FIG. 2, and is held in position of desired vertical adjustment by the lock bolt 84. A horizontal socket member 88 is welded to the upper end of the standard 86 and has a lock bolt 90 extending through a suitable tapped hole therein. A horizontal standard 92 extends freely through the horizontal socket 88 and is held in an adjusted position therein by the lock bolt 90. A flat rectangular clipboard 94 is welded or otherwise secured to the outer free end of the horizontal standard 92, and has spring clips 96 suitably secured to the upper and lower edges thereof for releasably securing a sheet of paper to the clipboard 94. If desired, the clipboard 94 may also be connected by a pivot or swivel connection with the horizontal standard 92. Otherwise, the clipboard 94 may be welded to the standard 92 at an included angle of around 45°. The standard 92 can be reversed to extend through the horizontal socket 88 from the other side thereof if so desired and the clipboard is then inverted.

Suitable holes may be provided in the upper panel 36 and the downwardly extending peripheral flange thereon for receiving bolt and nut assemblies to removably bolt a box-like member 102 to one end of the work table B. The box-like member 102 may be used to hold price marking tools, orders, and the like, and also forms an upper work surface spaced above the upper panel 36.

Figure 5:
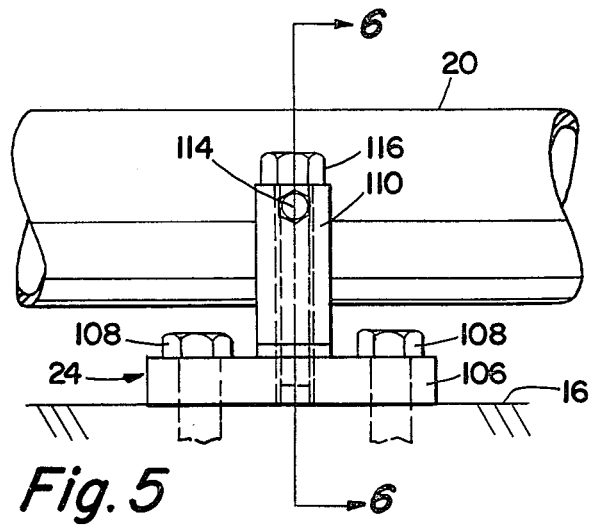
FIG. 5 is a partial side elevational view of a rail used in the system of FIG. 1.

As best shown in FIGS. 5 and 6, the support and leveling assemblies 24 include rectangular flat floor plates 106 suitably secured to a floor as by bolts 108. Upright saddle members 110 have arcuate saddles 112 therein for closely receiving the cylindrical rail 20. The arcuate saddles 112 preferably extend over an arc slightly greater than 180° so that rail 20 is locked therein. The rail 20 is further locked against any movement relative to the saddle members 110 by lock bolts 114 extending through suitable tapped holes therein for engaging the rail 20. Assembly bolts 116 extend freely through vertical holes in the saddle members 110 into threaded engagement with suitable tapped holes in the floor plates 106. Suitable shims 120 are selectively positionable between the floor plates 106 and the saddle members 110 for leveling the rail 20. Sections of pipe forming the rail 20 may be joined together in any suitable manner as by the use of short splice bars closely fitting within the ends of the pipes. The splice bar may have a short pin press fit into a hole in a central portion thereof so the pin extends radially of the cylindrical splice bar. The ends of the pipe may have semicircular or V-shaped notches through an endwall surface for receiving the pin. Suitable end caps or other stops may also be secured to the ends of the rail 20 to prevent the work table from rolling off same. It is also possible to mount at least the inboard wheels on vertical swivels to follow a rail which curves from one rack to another.

While there has been described what is at present considered to be the preferred embodiment of this invention, it will be obvious to those skilled in the art that various changes and modifications may be made therein without departing from the invention, and it is aimed, therefor, in the appended claims to cover all such changes and modifications as fall within the true spirit and scope of the invention.

What is claimed is:

1. A merchandise order picking system comprising:
    (a) a vertically and horizontally elongated rack having a plurality of vertically-spaced shelves and being supported on a floor surface, said rack having a rear face whereat merchandise is positioned on said shelves and a front face whereat merchandise is removed from said shelves, said shelves being downwardly inclined from said rear face toward said front face for gravity flow of merchandise therealong;
    (b) an elongated rail mounted above said floor surface and extending along said front face adjacent said floor surface;
    (c) a wheeled work table having a pair of inboard wheels supported and guided on said rail and a pair of outboard wheels supported on said floor surface for rolling movement of said work table along said front face;
    (d) said table including a substantially rectangular horizontal panel having an outer periphery and said rail being located between said rack and said panel;
    (e) a plurality of upright frame members supporting said panel and secured thereto against said outer periphery thereof, said frame members including inboard upright frame members adjacent said front face of said rack and outboard upright frame members spaced outwardly from said front face of said rack;
    (f) an elongated substantially horizontal frame member having opposite ends and being secured to said inboard upright frame members outside said outer periphery of said panel on the opposite side of said inboard upright frame members from said panel;
    (g) said inboard wheels being secured to said horizontal frame member adjacent said ends thereof;
    (h) said outboard wheels being mounted on said table within said outer periphery of said panel;
    (i) said inboard wheels having inboard wheel axes extending substantially perpendicular to said rail and said outboard wheels having outboard wheel axes extending substantially parallel to said inboard wheel axes;
    (j) said inboard wheel axes being spaced above said floor a substantially greater distance than said outboard wheel axes; and
    (k) said inboard wheel axes being spaced-apart a substantially greater distance than said outboard wheel axes.

2. The order picking system of claim 1 wherein said panel defines an upper panel and further including:
    (a) a substantially rectangular horizontal lower panel spaced a substantial distance from said upper panel and having a lower panel outer periphery;
    (b) said panels having opposite ends, inboard and outboard sides, and inboard and outboard corners;
    (c) said outboard upright frame members being welded to said panels adjacent said outboard corners thereof;
    (d) said inboard upright frame members comprising a spaced-apart pair of inboard upright frame members welded to said inboard sides of said panels in spaced-apart relationship at locations spaced substantially inwardly from said inboard corners; and
    (e) said outboard wheels being mounted on the underside of said lower panel.

3. The order picking system of claim 2 wherein:
    (a) said outboard wheels are mounted within said outer periphery of said lower panel closely adjacent said outboard corners thereof;
    (b) said inboard wheels being mounted outside said outer periphery of said panels between said inboard sides thereof and said front face of said rack; and
    (c) said inboard wheels being mounted extending outwardly beyond said ends of said panels.

4. A mobile work table for an order picking system or the like, said table having opposite inboard and outboard sides and opposite ends;
    (a) vertically-spaced upper and lower substantially horizontal rectangular panels each having an outer periphery and inboard and outboard corners;
    (b) a pair of outboard upright frame members extending between said panels adjacent said outboard corners thereof and being welded thereto against said outer periphery of each said panel;

(c) a pair of inboard upright frame members extending between said upper and lower panels adjacent said inboard corners thereof and being welded thereto against said outer periphery of each said panel;

(d) said inboard upright frame members being welded to said panels on said inboard side of said work table and being spaced substantially inwardly from said inboard corners;

(e) an elongated substantially horizontal frame member secured to said inboard upright frame members against the surfaces thereof facing outwardly of said inboard side of said work table;

(f) a pair of outboard wheels secured to the underside of said lower panel adjacent said outboard side of said work table for rotation about outboard wheel axes extending parallel to said work table ends;

(g) a pair of spaced-apart inboard wheels secured to said horizontal frame member adjacent the opposite ends thereof for rotation on inboard wheel axes extending parallel to said outboard wheel axes;

(h) said inboard wheel axes being spaced above said outboard wheel axes; and (i) said inboard wheels having circumferential track receiving grooves therein of generally arcuate cross-sectional shape.

5. The work table of claim 4 wherein:
(a) said inboard wheels are outside the periphery of said panels; and
(b) said outboard wheels are inside the periphery of said panels.

6. The work table of claim 4 wherein:
said outboard upright frame members being welded to said panels along said ends of said work table closely adjacent said outboard corners.

7. The work table of claim 6 wherein:
(a) said inboard wheels are outside the periphery of said panels;
(b) said outboard wheels being inside the periphery of said panels; and
(c) said inboard wheels axes being spaced-apart a substantially greater distance than said outboard wheel axes.

* * * * *